Patented Sept. 12, 1939

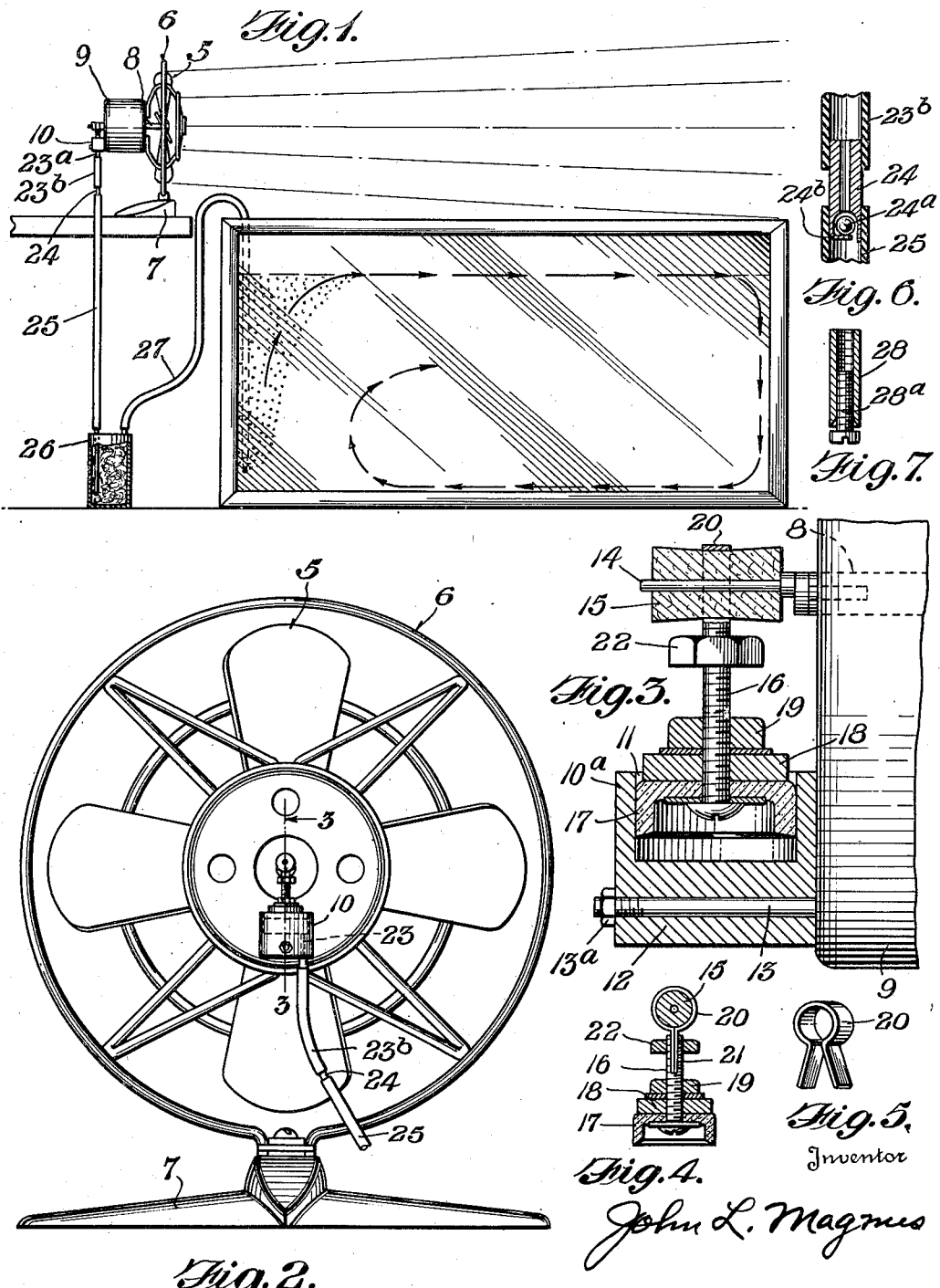

2,172,799

UNITED STATES PATENT OFFICE 2,172,799

AQUARIUM CONDITIONER

John L. Magnus, Washington, D. C.

Application August 5, 1936, Serial No. 94,457

1 Claim. (Cl. 261—121)

This invention relates to a device or apparatus for conditioning water in aquariums, and while its function is primarily aeration, yet it is capable of use in other phases of conditioning, such as chemical treatment, filtration and the like which are generally carried out in conjunction with aeration.

Conditioning and more particularly aeration of aquariums is becoming recognized as an essential in this industry or hobby. Aerating devices are generally in the form of pumps, diaphragm pulsators or the like, and up to the present time they have been open to the objections of expense, short life, vibration, noise and inefficiency generally. To attain maximum efficiency, not only is it desirable to aerate from beneath the surface of the water, but also above the surface as well.

An object of this invention is to provide an aquarium conditioner or aerating device which is highly efficient yet simple, comparatively inexpensive, noiseless, durable and capable of long life.

Another object of the invention is to provide an aerator for aquariums which aerates both above and below the surface of the water to therefore produce maximum efficiency, and at the same time to construct the apparatus in the form of a unit wherein the parts are of such simple construction and coact to produce this desirable method of aeration so economically as to bring effective aquarium conditioning within the range of the average buying public.

Another object of the invention is to provide an aerator wherein aeration is produced by a pump having few moving parts arranged to be substantially free from wear and noise throughout the life of the device, and which may be readily adjusted to vary the capacity of the pump.

Another object of the invention is to provide a device of this kind including a pump for aerating beneath the surface of the water and in combination therewith means for dispelling gases from the surface of the water and hastening cooling of the water, said latter means also serving to insure a continuous supply of fresh air to the pump inlet and at the same time as a cooling means for pump motor.

Other objects and advantages will become apparent when taken in conjunction with the drawing, wherein:

Fig. 1 is a view in side elevation of the improved conditioner and aerator operatively mounted in conjunction with an aquarium.

Fig. 2 is an enlarged view in rear end elevation of the device.

Fig. 3 is an enlarged fragmentary sectional view taken substantially on the line 3—3 of Fig. 2.

Fig. 4 is a detail view in transverse vertical section through the pump plunger and coacting parts.

Fig. 5 is a detail perspective of a preferred type of connecting member for the plunger.

Fig. 6 is a sectional view of a preferred type of check valve; and

Fig. 7 is a similar view of a valve for regulating the exhaust of air beneath the water.

The improved conditioning and aerating apparatus comprises generally a combination fan and pumping apparatus coordinated to attain the most beneficial and efficient and at the same time economical conditioning and aerating action which to my knowledge has heretofore been known. Referring to the drawing in detail numeral 5 generally designates a fan, which may be of any size suitable to obtain the proper volume or velocity of air in accordance with the size of the aquarium being aerated, said fan in the present instance being provided with the conventional guards or frame 6, which is mounted on a stand or pedestal 7. The fan shaft is indicated at 8, said shaft being driven by a motor, preferably electric, the housing of which is indicated at 9.

Mounted on the rear wall of the housing 9 is an air pump, generally indicated at 10, the construction of said pump being best shown in Fig. 3. The pump assembly comprises a cylindrical housing or casing 10a having a cylindrical chamber 11 and a base 12 which is transversely bored to receive a bolt or screw 13 which is secured to the housing 9 at its inner end and at its outer end is screw threaded to receive a securing nut 13a. The rear end of the fan or armature shaft 8 has connected to or formed as a part thereof an eccentric or crank shaft 14 having mounted thereon a bushing or bearing 15 which will subsequently be more fully described. The piston or plunger assembly comprises a connecting rod 16 having mounted on the lower end thereof a plunger valve 17 of flexible material such as soft leather or the like, said valve being clamped against a head or disc 18 and locked in position by means of a nut 19. The valve 17 contracts and admits air to the chamber 11 on the upstroke of the plunger or piston and expands and seals the chamber on the down or work-stroke of the piston.

In a construction of this kind, it is essential that the parts run quietly throughout the life thereof, one of the faults common to motor-driven aerators being that within a relatively short time bushings or bearings develop wear, with the result that the parts vibrate and become noisy and soon render the device useless. Since the pump operates very rapidly, or in fact consists of a series of pulsations, it will be seen that once wear develops and vibration sets in, within a comparatively short time the parts will loosen and require renewal. I have effectively overcome this objection by utilizing a relatively soft fibrous bearing, such as a piece of felt, which I impregnate with oil and mount on the shaft. Connection with the pump plunger is made by means of a flexible band 20 which has its opposite ends brought together and inserted in a slot 21 formed in the upper end of the connecting rod 16, the band being adjustably clamped in position by means of a nut 22. I have found that this type of bushing will wear almost indefinitely without developing the slightest noise or vibration. Should an adjustment be desired, it may be accomplished in a very simple manner by taking up on the meeting ends of the band 20. If the bushing is renewed, the cost is practically negligible.

The base of the pump cylinder 10a is formed with an outlet passage or opening 23, note Fig. 2, and attached to the lower end of this passage is a tubular member 23a having connected thereto a tube length 23b which carries a check valve shown in detail in Fig. 6 and consisting simply of a small tubular housing 24 which is bored and has disposed in the lower end thereof a ball valve 24a held in position by an inbent segment 24b of a split flange formed on the lower end of the housing 24 as a result of the milling or cutting-out operation when forming the ball housing. While the valve 24 could be installed directly in the passage 23, I have found that the type of installation herein shown facilitates removal and cleaning and also deadens any sound that may result due to the operation of the valve.

A conduit consisting of a length of flexible tubing 25 connects with the lower end of the valve 24 and leads down to a combined pressure tank and muffler 26, note Fig. 1, and from this tank 26 another conduit or length of flexible tubing 27 leads into the aquarium and at its lower end is provided with an adjustable outlet valve, which consists simply of a screw threaded housing 28 having a screw 28a loosely and adjustably mounted therein, note Fig. 7. The tank 27 ensures a steady, non-pulsating supply of air with a minimum of disturbance at the valved outlet of the conduit; while the outlet valve provides a simple means for adjusting the volume of air admitted into the aquarium. To further deaden the pump pulsations, I prefer to insert a deadening medium, such as steel wool or like fibrous material in the tank 26 and extend the end of conduit 25 well down into the tank, note Fig. 1.

The operation of the device will be readily apparent. When the fan is turned on, the pump plunger is reciprocated rapidly, building up air pressure in the combined tank and muffler 26, the air passing into the aquarium in accordance with the adjustment given the valve 28. At the same time fresh air is blown over the surface of the water. Since a draft of air is continuously drawn past the pump, fresh air only is taken into the air intake, and as the carbon dioxide and other noxious gases are brought to the surface by the aerating action beneath the surface, such gases are immediately dissipated and at the same time circulation of the water is facilitated or expedited, note the cycle indicated by the arrows in Fig. 1. Thus the device aerates and conditions both beneath and above the surface of the water. This arrangement also provides an air cooled motor for the pump as an incidental feature in conjunction with the other important advantages brought about by the use of the fan.

Another feature of advantage is that by adjusting the height of the lowermost point of reciprocation of the plunger 17 in the cylinder 10a, the pressure generated by the pump may in turn be adjusted. This is brought about due to the fact that the closer the said plunger reciprocates to the bottom of the casing, the more effective will be the checking action of the ball valve 24a, so that there will be less back pressure on the plunger. This adjustment may be effected by loosening nut 22 and relatively moving rod 16 on ends of band 20.

The entire apparatus or unit may be economically produced and fills a marked need in the evergrowing hobby or industry. The fact that the driving means or motor is common to both the pump and fan contributes materially to low cost production and operation.

It will be understood that in the foregoing description, I have enumerated only some of the advantages and objects that may be obtained by the use of the improved device, and further that certain variations in structure, design and arrangement of the several parts may be adopted within the scope of the invention as defined by the appended claim.

I claim:

In combination, an aquarium, a motor driven fan associated with the aquarium at one end thereof in a manner to direct a blast of air in contact with and over the surface of the water in the aquarium, means actuated by said motor for providing submerged aeration of the water at the same end of said aquarium, the surface and under surface aeration thereof coacting to cause circulatory movement of the water in the aquarium in a definite manner to expedite uniform treatment of the body of the water and removal of noxious gases from the same.

JOHN L. MAGNUS.